(12) United States Patent
Spiri et al.

(10) Patent No.: US 7,341,481 B2
(45) Date of Patent: Mar. 11, 2008

(54) POWER CONTROL CIRCUIT

(75) Inventors: Kelly Spiri, Milford, MA (US); Larry Wells, Rochester, NY (US)

(73) Assignee: DGC Products, Inc., Milford, MA (US)

( * ) Notice: Subject to any disclaimer, the term of this patent is extended or adjusted under 35 U.S.C. 154(b) by 0 days.

(21) Appl. No.: 11/436,714

(22) Filed: May 18, 2006

(65) Prior Publication Data

US 2006/0292924 A1  Dec. 28, 2006

Related U.S. Application Data

(60) Provisional application No. 60/690,779, filed on Jun. 15, 2005.

(51) Int. Cl.
*H01R 13/60* (2006.01)

(52) U.S. Cl. .................................... 439/535

(58) Field of Classification Search ............... 439/535, 439/490; 327/456, 455; 307/11, 35, 41, 307/38, 39, 126, 112; 323/239, 237; 340/657, 340/656; 363/37; 364/492, 141; 361/191, 361/151

See application file for complete search history.

(56) References Cited

U.S. PATENT DOCUMENTS

| | | | |
|---|---|---|---|
| 4,659,941 A | 4/1987 | Quiros et al. ................. 307/11 |
| 4,769,555 A * | 9/1988 | Pequet et al. ............... 307/141 |
| 4,825,140 A | 4/1989 | St. Louis .................... 323/237 |
| 5,099,157 A | 3/1992 | Meyer ........................ 327/456 |
| 5,117,122 A * | 5/1992 | Hogarth et al. ............. 307/140 |
| 5,256,906 A | 10/1993 | Tsuge et al. .................. 307/39 |
| 5,281,859 A | 1/1994 | Crane ......................... 307/139 |
| 5,384,490 A | 1/1995 | Swartz, Jr. ................... 307/38 |
| 5,442,335 A | 8/1995 | Cantin et al. .......... 340/825.71 |
| 5,450,334 A * | 9/1995 | Pulizzi et al. ............... 700/295 |
| 5,541,457 A | 7/1996 | Morrow ....................... 307/38 |
| 5,598,039 A | 1/1997 | Weber ......................... 307/38 |
| 5,731,947 A | 3/1998 | Hirose ........................ 361/160 |
| 5,747,973 A | 5/1998 | Robitaille et al. .......... 323/239 |
| 5,955,791 A | 9/1999 | Irlander ....................... 307/38 |
| 6,044,519 A | 4/2000 | Hendrix ....................... 15/319 |
| 6,222,285 B1 | 4/2001 | Haley et al. ................ 307/129 |
| 6,388,853 B1 * | 5/2002 | Balakrishnan et al. ..... 361/93.9 |
| 7,149,065 B2 * | 12/2006 | Baldwin et al. .............. 361/42 |

* cited by examiner

*Primary Examiner*—Alexander Gilman
(74) *Attorney, Agent, or Firm*—Nields & Lemack

(57) ABSTRACT

The present invention provides for a highly reliable circuit, suitable for controlling the delivery of electrical power to a second electrical outlet, based on the power consumption of a first outlet. This circuit has application in home, small workshops and on job-sites where the activation of a power tool, necessitates the activation of a dust collecting device. Because of the compact size, other household applications are also possible. Briefly, a microcontroller monitors the current used by the first outlet. When that current exceeds a first predetermined value, the controller enables the second outlet after a first predetermined period of time. When the current drops below a second predetermined value, the controller disables the outlet after a second predetermined period of time.

8 Claims, 2 Drawing Sheets

TYPE ONE
"Modular"

TYPE TWO
"ext. Box"

POWER CONTROL CIRCUIT

This application claims priority of U.S. Provisional application No. 60/690,779 filed Jun. 15, 2005, the disclosure of which is incorporated herein by reference.

BACKGROUND OF THE INVENTION

There are many instances where the use of one electrically powered device necessitates the need or desire to use a second device. One such instance exists in the industrial or home workshop. Often, after a power tool is activated, it is desirous to also activate a vacuum or other electrically powered particle collector. Most power tools have a 1¼" or 2" dust port for a shop vacuum connection in order to collect sawdust and wood chips. For example, the operator activates a power tool, such as a drill, a miter or table saw, and some time shortly thereafter, the vacuum automatically engages. Once the power tool has been disengaged, the vacuum automatically disengages a short time thereafter. In this way, the operator is freed from the inconvenience of having to activate and deactivate the vacuum before and after the use of a power tool. Similarly, there are other situations where this solution would be desirous. For example, a user, upon activating his television, may desire that his stereo or cable box automatically activate. Similarly, the activation of one's personal computer could be used to automatically engage the associated monitor, printer or other peripheral devices.

Many of the circuits designed to address this problem suffer from one or more shortcomings. For example, some circuits activate a second electrical outlet immediately upon detecting current flow through a first outlet. This can cause circuit breakers to trip due to the large simultaneous startup currents of the two devices. To correct this, some circuits utilize an analog delay mechanism, such as an RC time constant to offset the activation times of the two devices. While this alleviates the problems associated with simultaneous activation, such circuits are inflexible, only capable of a predetermined delay, which is only alterable through changes to the components on the circuit board. Also, analog components, such as op-amps and the like, can be less reliable than digital circuitry.

The present invention overcomes the shortcomings of the prior art through the use of a digital microcontroller controlled circuit, with increased reliability and which allows the turn-on and turn-off delays to be easily programmed and modified.

SUMMARY OF THE INVENTION

The present invention provides for a highly reliable circuit, suitable for controlling the delivery of electrical power to a second electrical outlet, based on the power consumption of a first outlet. This circuit has application in home and small workshops where the activation of a power tool, necessitates the activation of a dust collecting device. Because of the compact size, other household applications are also possible. Briefly, a microcontroller monitors the current used by the first outlet. When that current exceeds a predetermined value, the controller enables the second outlet after a first predetermined period of time. When the current drops below that predetermined value, the controller disables the outlet after a second predetermined period of time.

DETAILED DESCRIPTION OF THE INVENTION

Figure 1:
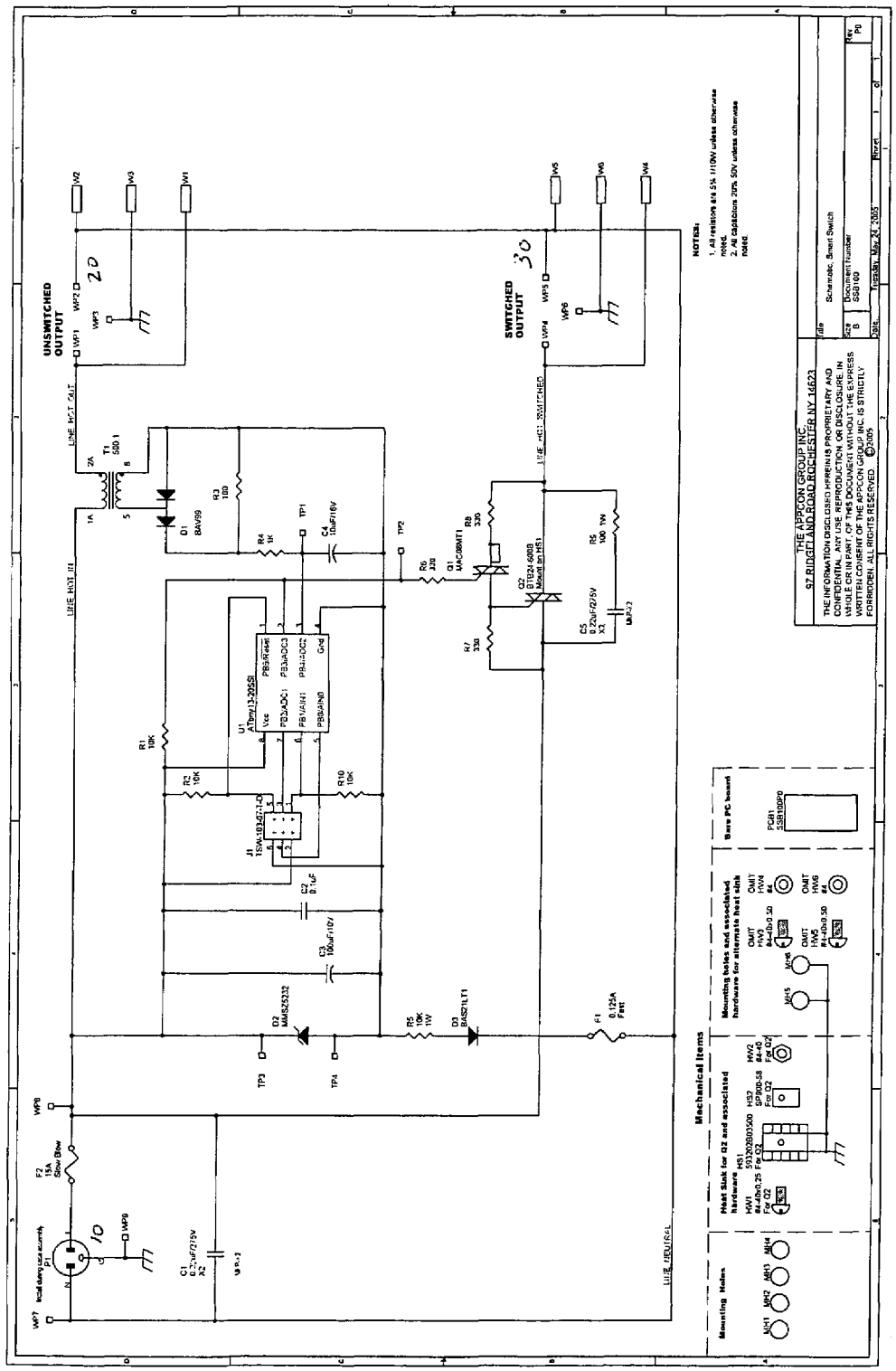
FIG. 1 illustrates a schematic diagram of a representative embodiment of the present invention.
Figure 2A:
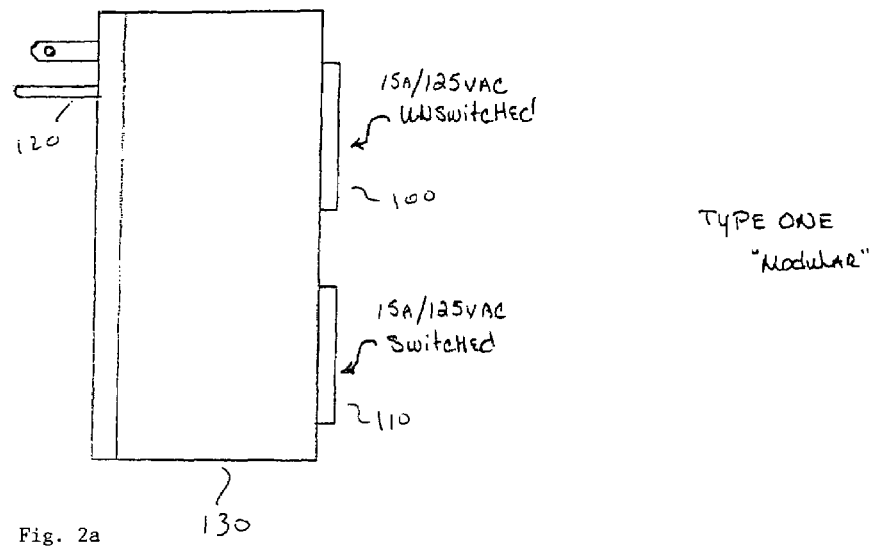
FIG. 2a represents a first embodiment of the enclosure for the present invention.
Figure 2B:
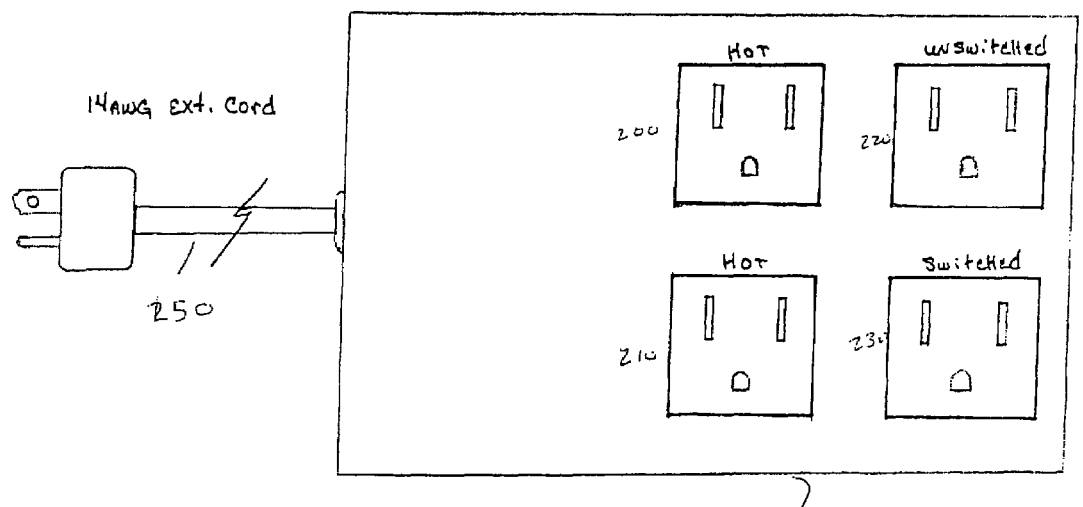
FIG. 2b represents a second embodiment of the enclosure for the present invention.

FIG. 1 illustrates a schematic diagram of a representative embodiment of the present invention. Input plug 10 represents the connection from the present invention to an electrical power source. This plug can be integral to the enclosure, as shown in FIG. 2a, or at the distal end of a power cord, as shown in FIG. 2b. One input terminal from plug 10, preferably the neutral line, is connected directly to one of the contacts of unswitched output 20 and one of the contacts of switched output 30. The other input terminal from plug 10, or the "hot" line, is connected to the second contact of unswitched output 20 through transformer T1. In the preferred embodiment, transformer T1 has a windings ratio of 500:1, such that the current produced at the secondary winding is 500 times less than that passing through the primary winding. This small alternating current is then converted into a DC voltage, such as by using diode D1, resistors R3 and R4, and capacitor C4. This DC voltage is made available to the control circuitry, such as microcontroller U1. This combination of transformer, diode, resistor and capacitor comprises one embodiment of a sensing circuit, which is used to produce a DC voltage which varies proportionally to the current used by unswitched output 20. In the preferred embodiment, a 8 bit microcontroller is used. The microcontroller of the preferred embodiment has an internal clock generator, at least one general purpose output and at least one analog to digital converter. Other preferred features include a programmable timer, such as a 555 timer, internal random access memory (RAM), and read only memory (ROM), preferably in the form of EEPROM or FLASH ROM. The incorporation of these features reduces the parts count and cost, and improves the reliability of the circuit. In the preferred embodiment, the microcontroller is programmable, such as during manufacture and optionally during actual field use.

Returning to FIG. 1, the DC voltage, which corresponds to the alternating current passing to the unswitched output 20 is sampled by microcontroller U1. When this voltage exceeds a first predetermined threshold, which is programmed into the microcontroller, the software determines that the unswitched output is in use. In the preferred embodiment, this first threshold is defined so as to correspond to about 1 Amp, although the invention is not limited to this value. Other applications may necessitate the need for a threshold which may be higher or lower than this value. For example, if the preset invention is used to enable electrical power to flow to an associated monitor or printer when a personal computer is turned on, a different threshold value may be appropriate. After waiting a first predetermined period of time, the microcontroller asserts one of its general purpose outputs. In the embodiment shown in FIG. 1, microcontroller U1 drives the output corresponding to pin 2 low when this predetermined time period has elapsed. This signal is connected to the gate of triac Q1, thereby enabling it. Triac Q1 then supplies the necessary current to triac Q2, thereby enabling it and allowing current to pass to switched output 30. Triac Q2 is the power triac, responsible for supplying the power to the auxiliary outlet when appropriate.

At a later time, if the voltage presented at the A/D input of microcontroller U1 drops below a second predetermined threshold, the microcontroller will deassert its general purpose output after a second predetermined time period has elapsed. This has the effect of disabling the triacs at the line voltage zero crossing and thereby turning off the switched output 30. This second predetermined threshold can be the same as the first threshold, but is preferably lower, thereby providing some amount of hysteresis. In the preferred embodiment, this second threshold is 0.8 Amps, although the invention is not limited to this or any particular value. This delay period is variable, and can be beneficial in scenarios where the switched outlet is used to power a vacuum. In this case, after the saw is turned off, the vacuum continues to operate long enough to clean any remaining debris.

Returning to FIG. 1, diodes D2 and D3, resistor R5 and capacitor C3 form the power supply used by microcontroller U1. Diode D2 is preferably a zener diode, with a reverse breakdown voltage of 5.6V. It is connected directly to the "hot" line, thus the voltage supplied to the microcontroller is exactly that of the "hot" line. Capacitor C3 is in parallel with this zener diode, and maintains this voltage. Diode D3 is in series with diode D2 and capacitor C3 to insure that current does not flow from the neutral line through the zener diode during periods when the neutral line is at a higher potential than the "hot" line. Thus the junction between diode D2 and resistor R5 is 5.6V below the level of the "hot" line at all times.

Jumper Block J1 allows for maximum flexibility of operation. For example, the user or manufacturer can choose to insert one or more jumpers in jumper block J1. During initialization, the microcontroller U1 monitors the voltage levels at several of its general purpose inputs to detect the presence or absence of these particular jumpers. The specific combination of jumpers detected can be used to determine the desired values of different parameters, including but not limited to turn-on current, turn-off current, turn-on delay time, and turn-off delay time. For example, the presence of a specific jumper may be used to set the delay times to their maximum duration, while the absence of that jumper may signify that minimum durations should be used. Thus, without any modifications to the circuitry, or to the software program, the functionality of the device can be modified, based on the particular application in which the device is to be used. In another embodiment, jumper block J1 can be used in conjunction with a computer, such as a laptop computer, to facilitate programming of the microcontroller after its shipment to customers.

FIG. 2 illustrates two physical embodiments of the present invention. In FIG. 2a, the input terminal 120 and two outputs 100,110 are encased in a small enclosure 130, with the input terminal adapted to be inserted into an electrical outlet. The use of digital electronics minimizes the power consumed by the present invention, allowing it to safely operate in a small enclosure. In the preferred embodiment, the enclosure 130 measures 2.5"×4"×2". Output 100 is an unswitched electrical outlet, while output 110 is switched based on the current flow through output 100, as described above.

FIG. 2b shows a second embodiment of the present invention. In this embodiment, an extension cord 250 is used, terminating in an electrical plug 240 adaptable to be inserted into an electrical outlet. The enclosure 240 contains four outputs. In FIG. 2b, two of these outputs 200, 210 are traditional outputs, similar to those found on an extension cord or bus strip. Output 220 is the unswitched output as described in FIG. 1, while output 230 is the switched output. The invention is not limited to only this configuration. The enclosure 240 can be configured in a variety of ways. For example, two pairs of switched/unswitched outlets can be provided. Alternatively, one unswitched output can also be used to control a plurality of switched outputs.

As noted above, this circuit is adapted to operate in conjunction with a wide range of devices. For example, for traditional workshop uses, the circuit is operable withmost power tools, such as those with a rating of 125 Vac/15 Amp. Modification to the circuit can be made to accommodate other operating voltages and current requirements. Similarly, the circuit can be used in conjunction with televisions, stereos, computers and other electrical household devices.

In typical workshop applications, the unswitched outlet is preferably used in conjunction with a saw, such as a miter, table, circular or band saw, a sander or a router. The switched outlet is then used to operate a wet/dry vacuum, a dust collector, or a power feed attached to several other devices.

In residential applications, the unswitched outlet is preferably used in conjunction with a personal computer, while the switched outlet controls the associated monitor. Alternatively, the unswitched outlet may be used with a television, while the switched outlet is used to control the cable box, stereo or other electronic component.

What is claimed:

1. A power controller circuit comprising:
   an input having two terminals;
   a first output having two contacts, wherein a first of said two input terminals is connected to a first of said two contacts;
   a second output having two contacts, wherein a first of said input terminals is connected to said first of said two contacts;
   a sensing circuit, comprising a first connection to the second of said two input terminals, and a second connection to the second of said two contacts of said first output, and an output comprising a DC voltage varing proportionally the current passing between said first and second connections;
   a triac, having a first terminal connected to the second of said input terminals, a second terminal connected to the second of said two contacts of said second output, and a gate; and
   a microcontroller, having a first connection to said DC voltage, and a second connection to said gate.

2. The power controller circuit of claim 1, wherein said sensing circuit comprises:
   a transformer, comprising a primary and a secondary winding, each winding comprising two contacts, wherein a first of said two contacts of said primary winding is connected to the second of said two input terminals, and the second of said two contacts of said primary winding is connected to the second of said two contacts of said first output; and
   circuitry for converting the current passing through said two contacts of said secondary winding into a DC voltage.

3. The power controller circuit of claim 1, wherein said microcontroller asserts the signal connected to said gate in response to said DC voltage exceeding a first predetermined threshold and deasserts said signal in response to said DC voltage dropping below a second predetermined threshold.

4. The power controller circuit of claim 3, wherein said first and second predetermined thresholds are different.

5. The power controller circuit of claim 3, wherein said first and second thresholds are programmable.

6. The power controller circuit of claim 3, wherein said microcontroller delays a first time period before said assertion and delays a second time period before said deassertion.

7. The power controller circuit of claim 6, wherein said first and second time periods are different.

8. The power controller circuit of claim 6, wherein said first and second time periods are programmable.

* * * * *